United States Patent [19]
Boula et al.

[11] Patent Number: 5,491,316
[45] Date of Patent: Feb. 13, 1996

[54] PROCESS AND DEVICE FOR THE ELECTRON BEAM WELDING OF TWO PARTS OF A COMPONENT OF LARGE SIZE AND IN PARTICULAR OF A STEAM GENERATOR OF A PRESSURIZED WATER NUCLEAR REACTOR

[75] Inventors: Gerard Boula, Meursault; Yves Faunier, Chatenay Le Royal, both of France

[73] Assignee: Framatome, Courbevoie, France

[21] Appl. No.: 241,652

[22] Filed: May 12, 1994

[30] Foreign Application Priority Data

May 12, 1993 [FR] France ................... 93 05724

[51] Int. Cl.[6] ................................................. B23K 15/04
[52] U.S. Cl. .......................... 219/121.13; 219/121.22
[58] Field of Search ........................ 219/121.13, 121.14, 219/121.21, 121.22, 121.23, 121.28, 121.29, 121.3, 121.31, 121.32, 125.11, 159; 228/48

[56] References Cited

U.S. PATENT DOCUMENTS

| | | |
|---|---|---|
| 3,588,442 | 6/1971 | O'Riley . |
| 3,702,389 | 11/1972 | Peyrot . |
| 4,314,135 | 2/1982 | de Sivry et al. ............... 219/121.13 |
| 4,342,900 | 8/1982 | Susei et al. .................... 219/121.13 |
| 4,393,294 | 7/1983 | Shima et al. ................... 219/121.13 |

FOREIGN PATENT DOCUMENTS

| | | | |
|---|---|---|---|
| 2417703 | 10/1979 | France ................. | 219/121.13 |
| 1997172 | 2/1964 | Germany . | |
| 55-112187 | 8/1980 | Japan ................... | 219/121.13 |
| 55-54186 | 11/1981 | Japan ................... | 219/121.14 |

OTHER PUBLICATIONS

Search Report FR 93 05724.

*Primary Examiner*—Teresa J. Walberg
*Assistant Examiner*—Gregory L. Mills
*Attorney, Agent, or Firm*—Pollock, Vande Sande & Priddy

[57] ABSTRACT

The joint region (43) of the parts (27, 29) is surrounded by an enclosure (38) which is mounted in a fluidtight manner around a part of the outer surface of the component (31). The enclosure (38) carries an electron gun (39). A low pressure is created in a chamber (44) defined by the fluidtight enclosure (38) and by the outer surface of the component (31). A relative displacement is produced between the parts (27, 29) and the electron gun (39) to cause an electron beam emitted by the electron gun (39) to scan the joint region (43) during the welding. The process may be used in particular in the field of the manufacture of steam generators of pressurized water nuclear reactors.

4 Claims, 7 Drawing Sheets

PROCESS AND DEVICE FOR THE ELECTRON BEAM WELDING OF TWO PARTS OF A COMPONENT OF LARGE SIZE AND IN PARTICULAR OF A STEAM GENERATOR OF A PRESSURIZED WATER NUCLEAR REACTOR

FIELD OF THE INVENTION

The invention relates to a process for the electron beam welding of two parts of a component of large size, and in particular of a steam generator of a pressurized water nuclear reactor.

BACKGROUND OF THE INVENTION

Pressurized water nuclear reactors comprise components of large size such as steam generators which have a partly cylindrical outer casing of large diameter and very great height. This outer casing is usually constructed by butt welding cylindrical shells to each other or cylindrical shells to an annular assembly flange of a tube plate or a frusto-conical shell.

Also mounted on the outer casing are, in the region of through openings of the casing, parts such as supports for the closing members for closing the inspection openings of the steam generator, nozzles or feed pipes of the steam generator. These mounted parts are welded on the casing of the steam generator in a joint region opening onto the outer surface of the casing.

The assembling and fixing welds for the mounted parts are produced from outside the casing of the steam generator.

The electron beam welding permits the production, without a filler metal, of welded joints of a very high metallurgical quality, with production times which are considerably reduced as compared with conventional techniques, for example arc welding.

However, one of the difficulties in carrying out the electron beam welding results from the need to establish a relatively high vacuum around the region of the connection of the parts onto which the electron beam is directed.

In the case of parts of modest size, it is possible to achieve the welding inside a fluidtight enclosure enclosing the electron gun in which the parts are introduced and placed in their position of assembly before the enclosure is closed in a fluidtight manner and evacuated.

It will be clear that, in the case of components of very large size such as steam generators, the cost of installations comprising fluidtight enclosures of very large size and the cost of the operation may become prohibitive.

Heretofore no process for electron beam welding parts of a component of large size such as a steam generator has been known which may be employed in a simple and rapid manner so as to limit the time required to manufacture the steam generator.

In particular, in the field of operations for replacing steam generators, rapid manufacturing processes may have to be available rapid manufacturing processss inasmuch as it is preferable to program the manufacture of the steam generators, which are extremely costly components, for precise utilizations. The replacement generators must be available within a well-defined and usually short period of time.

SUMMARY OF THE INVENTION

It is an object of the invention to provide a process for the electron beam welding of two parts of a component of large size, such as a steam generator of a pressurized water nuclear reactor, which are connected in a joint region of substantially annular shape opening onto an outer surface of the component, this welding process permitting a reduction in the time it takes to manufacture the component and in the cost of the installation required for producing the weld.

For this purpose, the process comprises surrounding the joint region with an enclosure which is mounted in a fluidtight manner around a part of the outer surface of the component in which the contour of the annular joint region is located and which carries an electron gun, creating a low pressure inside a chamber defined by the fluidtight enclosure and by the outer surface of the component, and producing a relative displacement between the component parts and the electron gun so as to cause an electron beam produced by the electron gun to scan the joint region during the welding operation.

BRIEF DESCRIPTION OF THE DRAWINGS

In order that the invention may be better understood, there will now be described, by way of non-limitative examples, with reference to the accompanying drawings, several embodiments of the process according to the invention and installations required for carrying out the process for the welding of parts of a steam generator of a pressurized water nuclear reactor.

DETAILED DESCRIPTION

Figure 1:
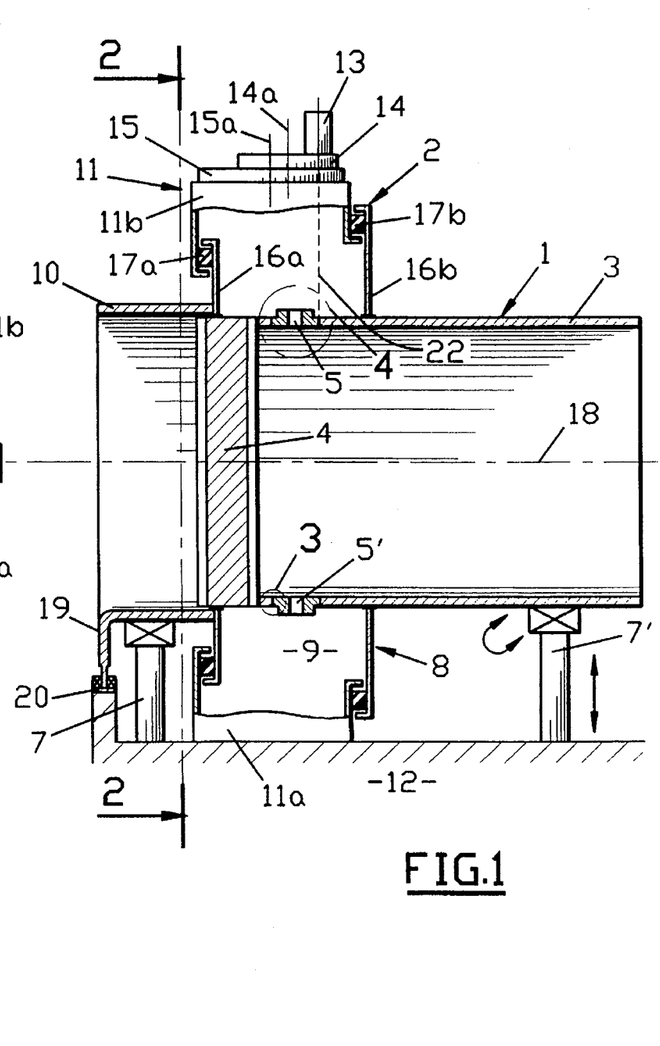
FIG. 1 is an elevational and sectional view in a vertical plane of a welding installation for carrying out the process according to the invention on a casing of the steam generator in horizontal position.

Shown in FIG. 1 is the lower part 1 of an outer casing of a steam generator of a pressurized water nuclear reactor disposed partly inside an installation 2 whereby it is possible to weld parts of the outer casing by means of an electron beam.

The lower part 1 of the steam generator is constituted by a cylindrical shell 3 which is mounted and fixed by welding to a very thick tube plate 4 through which extend above the tube plate 4 inspection openings such as 5 and 5' in the region of which are fixed by welding closing member supports of generally cylindrical shape.

The electron beam welding installation 2 permits producing the circular weld joint between the shell 3 and the tube plate 4 and the also circular weld joints between the nozzles for the inspection openings and the shell 3 constituting the casing of the steam generator.

The welding installation 2 comprises rotary supports 7 and 7', an enclosure 8 defining an annular chamber 9 around the casing of the steam generator and a bearing sleeve 10 connected to the enclosure 8 and resting on the front rotary support 7.

Figure 2:
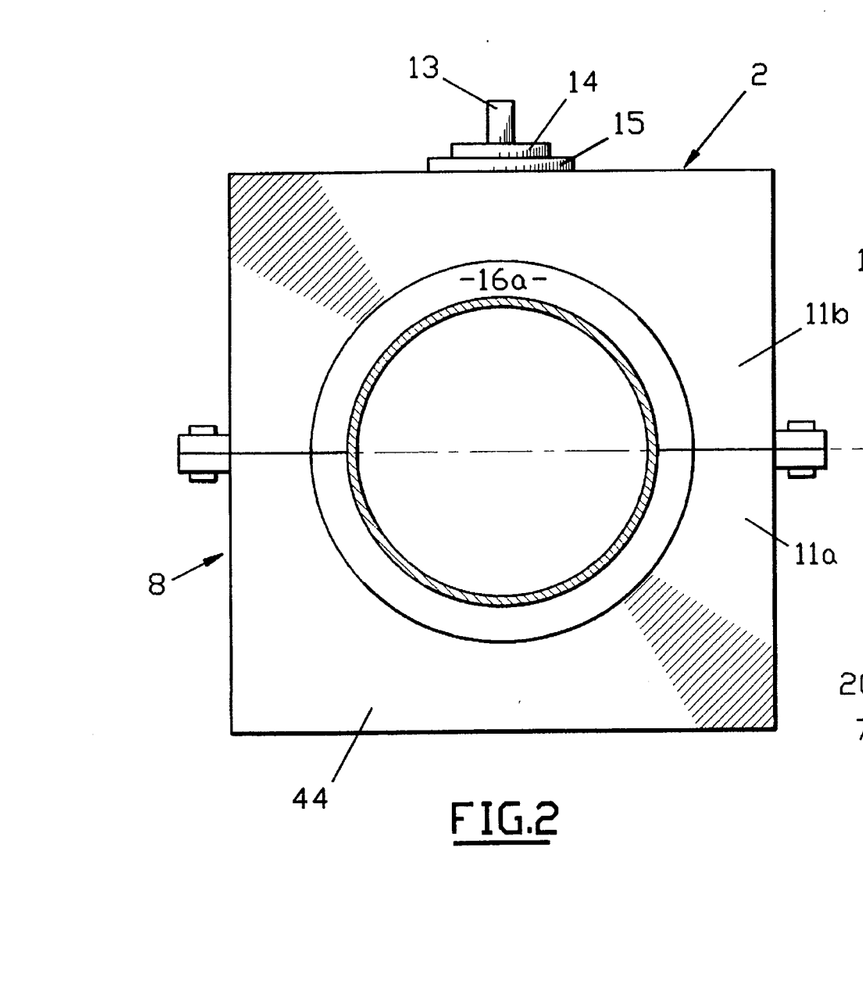
FIG. 2 is a front elevational view line 2—2 of FIG. 1.

As can be seen in FIGS. 1 and 2, the enclosure 8 comprises a fixed part 11 having a substantially parallelepipedic shape constituted by two parts 11a and 11b interconnected by screws and resting on the floor 12 of the installation, and a rotary part connected to the outer surface of the case of the steam generator constituted by the shell 3.

The fixed part 11 of the enclosure 8 carries an electron gun 13 through the medium of two superimposed plates 14 and 15.

The movable part of the enclosure 8 defining the chamber 9 around the case of the steam generator is constituted by two structural elements 16a and 16b in the form of annular flanges fixed in a fluidtight manner by their inner peripheral portion to the outer surface of the casing of the steam generator.

Sealing elements 17a and 17b are interposed between the flanges 16a and 16b and the fixed part 11 of the enclosure 8. The sealing elements 17a and 17b ensure the continuity of the seal of the enclosure 8 and permit the flanges 16a and 16b to rotate with respect to the fixed part 11 of the enclosure.

The supports 7 and 7' are constituted by posts carrying bearing rollers having horizontal axes on which rests the shell 3 of the casing of the steam generator (support 7') and the sleeve 10 connected to the enclosure 8 (support 7).

The assembly formed by the casing of the steam generator and the movable part of the enclosure 8 is thus mounted to be rotatable about the axis 18 of the casing of the steam generator in the horizontal position.

A flange 19 is fixed to the front end of the sleeve 10 connected to the enclosure 8 and engaged between two stops of a device 20 fixed to the floor 12 of the installation for axially maintaining the flange in position.

The enclosure 8 is connected to a pump circuit (not shown) for creating a low pressure in the chamber 9.

The axial forces exerted on the walls of the enclosure 8 and on the casing of the steam generator, after the chamber 9 has been evacuated, are supported by the flange 19 cooperating with the stops of the device 20.

An internal enclosure (not shown) is also disposed inside the shell 3 so that a low pressure can be established during the welding on the inner side of the weld joint.

The walls constituting the fluidtight enclosure may be placed in position inside the shell 3, with an internal equipment comprising in particular a bearing heel which comes into contact with the inner end of the welding bevel.

This internal equipment is disclosed in a patent application filed by Applicants on the same day as the present application and is included in the present disclosure by reference.

The electron gun 13 permits firing an electron beam 22 which is pointed in the direction of the joint region between the parts to be welded opening onto the outer surface of the casing of the steam generator and which constitutes the welding bevel.

The plate 15 is mounted to be rotatable on the upper fixed part 11b of the enclosure 8 about an axis 15a having a radial direction relative to the shell 3 and the plate 14 carrying the electron gun 13 is mounted to be rotatable about an axis 14 parallel to the axis 15 on the plate 15.

In this way, as will be explained in more detail hereinafter, it is possible to effect, by rotation of the plate 14 about its axis 14a, the positioning of the electron gun 13 and the electron beam 22, in the direction of the joint surface of the parts, and circular scanning, either by rotating the shell 3 and the movable part of the enclosure 8, or by rotating the plate 15.

Figure 3:
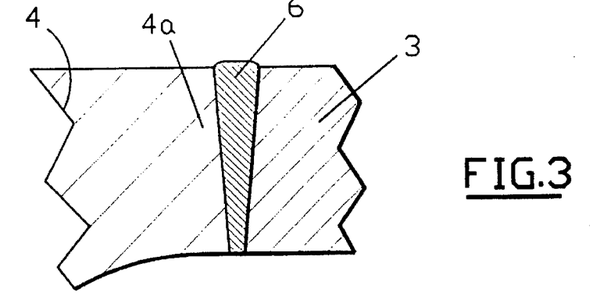
FIG. 3 is a sectional view of the detail 3 of FIG. 1.

FIG. 3 shows the weld 6 between the tube plate 4 and the shell 3, the tube plate 4 having a projecting annular portion 4a whose thickness is identical to the thickness of the shell 3. The projecting annular portion 4a and the shell 3 are brought against each other by their end surfaces on which are machined bearing surfaces, and maintained in the assembled position for effecting the weld.

By rotating the plate 14, the electron gun 13 is brought into such position that the beam 22 extends in a radial direction relative to the joint surface constituted by the superimposition of the bearing surfaces of the annular portion 4a and the shell 3, these juxtaposed bearing surfaces constituting the welding bevel.

The plate 14 is immobilized on the plate 15 which is itself immobilized on the fixed part 11b of the enclosure 8.

The chamber 9 and the internal chamber inside the shell 3 are put under a low pressure in the joint region, the assembly constituted by the casing 1 of the steam generator and the movable part of the enclosure 8 is rotated about the horizontal axis 18 and the electron gun 13 is started up so as to produce the electron beam 22. There is in this way achieved a continuous scanning of the joint region between the shell 3 and the tube plate 4 so that the weld joint 6 is produced by fusion of the metal of the shell 3 and the tube plate 4 in a very small thickness on each side of the annular joint surface.

It is also possible, by using the welding installation 2 whose enclosure 8 is placed around the casing of the steam generator, as shown in FIG. 1, to achieve the welding of circular parts inside openings extending through the shell 3 of the steam generator.

Figure 4:
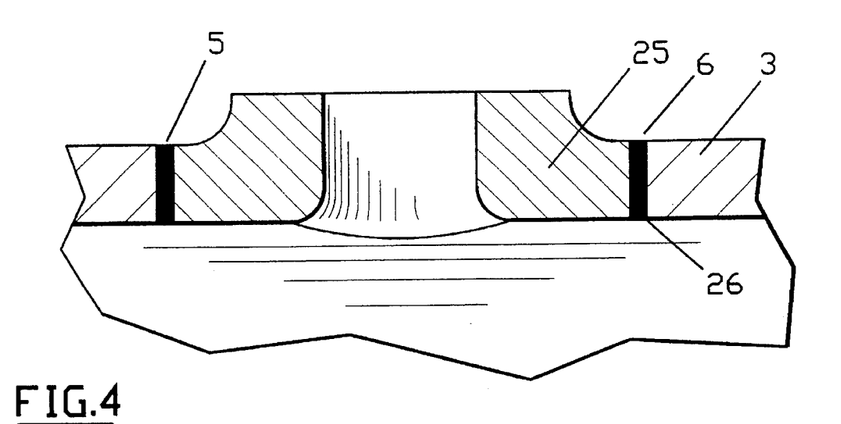
FIG. 4 is a sectional view of the detail 4 of FIG. 1.

In FIG. 4 there is shown an annular part 25 fixed to the interior of a receiving bore 5 extending through the wall of the shell 3 of the steam generator in the vicinity of the upper face of the tube plate 4.

The annular part 25 permits achieving a fluidtight fixing of a closing member on the inspection opening of the casing of the steam generator, usually termed handhole, for closing the casing of the steam generator in a fluidtight manner.

The outer peripheral surface of the part 25 and the surface of the receiving bore 5 are juxtaposed and define a welding bevel 6 of circular shape in the thickness of the shell 3 which opens onto the outer surface of the casing of the steam generator.

In order to effect electron beam welding of the part 25 inside the bore 5, an enclosure 8 such as that described hereinbefore is mounted around the outer surface of the casing of the steam generator so as to surround a part of this casing in which the bores 5 and 5' are machined.

The plate 14 is placed in such manner that the beam 22 of the electron gun 13 is pointed along a generatrix common to the outer surface of the part 25 and to the circular edge of the bore 5. This position of the electron beam 22 is shown in dotted lines in FIG. 1. The axis 14a of the plate 14 is in alignment with the axis of the opening 5. The position of the electron beam 22 is such that its distance from the axis 14a of the plate 14 is equal to the radius of the bore 5 so as to effect the welding of the parts extending through the casing of the steam generator at the handholes.

The welding bevel is scanned by rotating the plate 14 about its axis 14a.

In order to effect the welding of a part of larger diameter than the part 25 inside a bore having a diameter larger than the diameter of the bore 5, for example for welding a nozzle of a manway, the enclosure 8 is placed around the case of the steam generator in the region of the manway, the axis 15a of the plate 15 being aligned with the axis of the manway. The electron gun 13 is then placed in such position that it can fire an electron beam 22 in the direction of a generatrix of the manway, and then the plate 14 is fixed in position on the plate 15. The scanning for producing the weld is achieved by rotating the plate 15 about its axis 15a.

It is therefore possible to adjust the diameter of the surface scanned by rotating the plate 15, by adjusting the position of the plate 14 and of the electron gun 13, between a minimum value and a maximum value, as will be explained hereinafter.

The welding device 2 according to the invention may therefore be adapted to welding operations on parts of different sizes and shapes on the casing of the steam generator.

Figure 5:
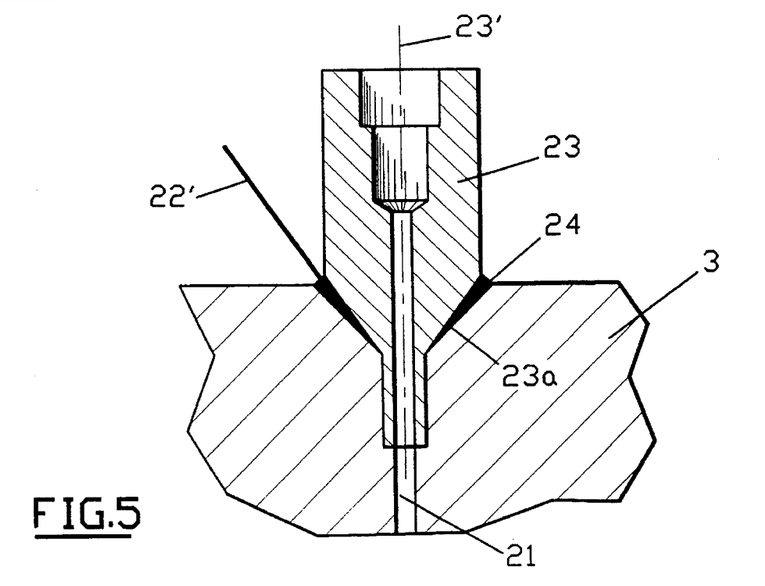
FIG. 5 is a sectional view of a nozzle connected by an electron beam welding to the casing of a steam generator.

Shown in FIG. 5 is a nozzle 23 comprising a frustoconical joint surface 23a inside a through opening 21 in the casing 3 of the steam generator comprising a part having a reduced diameter in the extension of the nozzle bore 23.

The through opening 21 of the shell 3 of the generator comprises, in the part thereof in the vicinity of the outer surface of the shell 3, a frustoconical surface on which the frustoconical surface 23a of the nozzle 23 comes to bear in its assembly position. An electron beam weld 24 can be produced by rotating an electron beam 22', which is inclined to the axis of the nozzle 23', about this axis.

This welding can be effected by using an electron beam welding device as shown in FIG. 1, by adding to the electron gun a magnetic coil capable of producing a field perpendicular to the beam emitted by the electron gun so as to deviate this beam in such manner as to cause it to adopt an inclination corresponding to the inclination of the generatrices of the welding bevel of frustoconical shape.

The inclined beam 22' obtained can be rotated about the axis 23' of the nozzle by rotating the plate 15 whose axis 15a is aligned with the axis 23' of the nozzle, after having adjusted the position of the electron gun 13 by means of the plate 14.

Figure 6:
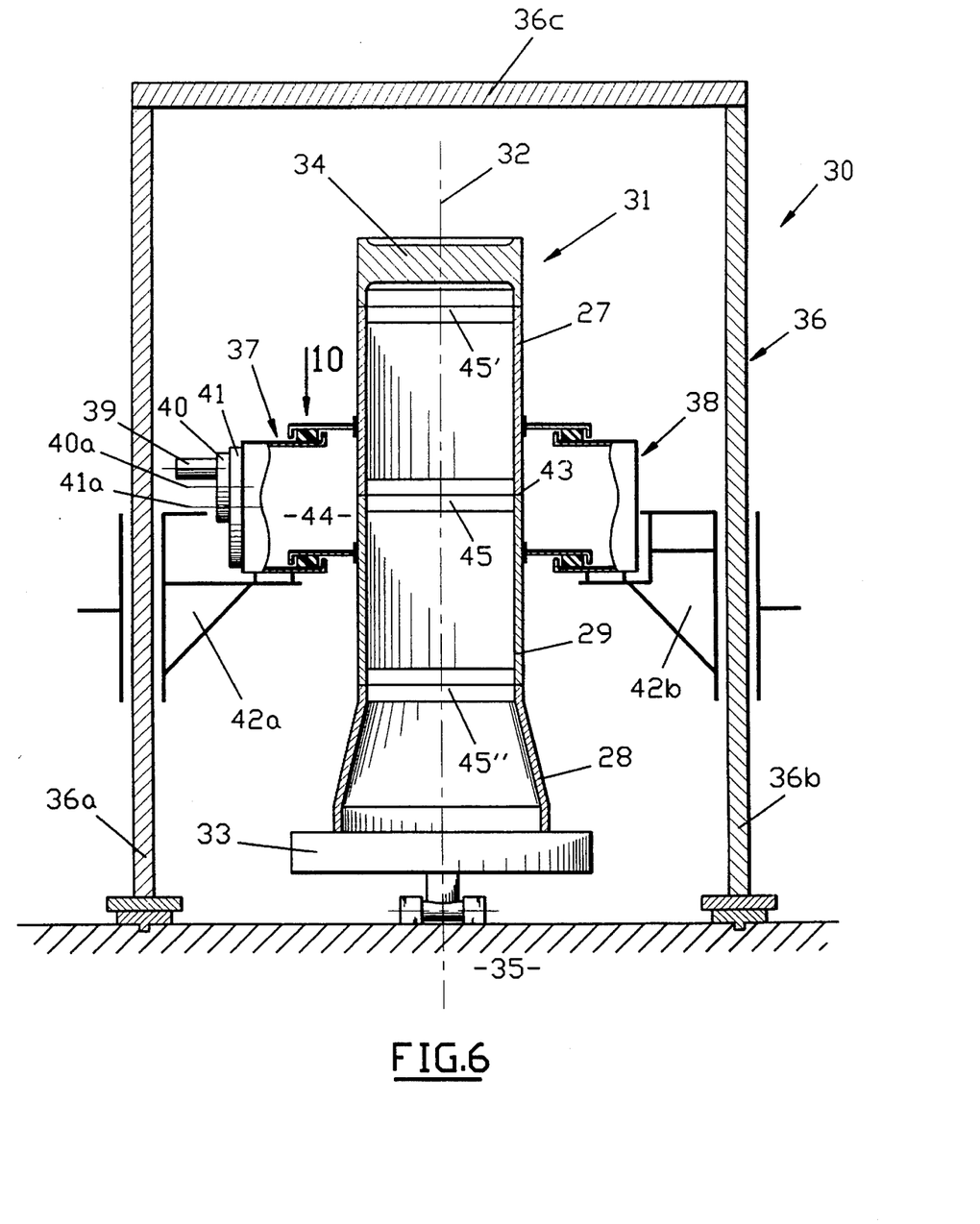
FIG. 6 is an elevational and sectional view of an installation according to a second embodiment permitting carrying out the process according to the invention for welding parts of a steam generator casing in a vertical position.

FIG. 6 shows a second embodiment of an installation 30 for carrying out the process according to the invention.

The installation 30 can be used for assembling shells or parts extending through the casing 31 of a steam generator and disposed with its axis 32 vertical.

The casing 31 of the steam generator is constituted by two cylindrical shells 27 and 29 butt welded by using the device according to the invention, and a frustoconical shell 28 butt welded through the medium of a cylindrical flange to the free end of the cylindrical shell 29.

The casing 31 of the steam generator which is placed in an overturned position relative to its service position, i.e., with its lower part constituted by the tube plate 34 uppermost, bears through the frustoconical shell 28 on a part of the welding device 30 constituted by a rotatable and tiltable plate 33 which rests on the floor 35 of the welding installation and permits rotating the case 31 of the steam generator about its vertical axis 32 and tilting the casing 31 to a position in which the axis 32 is horizontal.

The welding installation 30 further comprises a gantry 36 having vertical posts 36a and 36b and a horizontal plate 36c resting on the upper part of the vertical posts 36a and 36b.

The installation 30 also includes the welding device proper 37 comprising a fluidtight enclosure 38 on which an electron gun 39 is fixed by means of two rotative plates 40 and 41 having respective axes of rotation 40a and 41a.

The welding device 37 rests on movable supports 42a and 42b which are mounted to be slidable in the vertical direction along the posts 36a and 36b respectively and are associated with devices for shifting them in the vertical direction and locking them in a working position at a given height along the direction of the axis 32 of the steam generator.

The welding device 37 which rests on the supports 42a and 42b can be shifted in the axial direction 32 of the steam generator for electron beam welding different component parts of the casing 31 of the steam generator.

In the position shown in FIG. 6, the enclosure 38 of the welding device 37 surrounds the joint region 43 of circular shape between the cylindrical shells 27 and 29.

It is also possible to place the welding device 37 in such manner that the fluidtight enclosure 38 surrounds the lower part of the casing 31 in the vicinity of the tube plate 34. The welding device 37 can then effect the welding of the shell 27 to the tube plate 34 and the welding of the supports of the closing members of the inspection openings located in the vicinity of the tube plate.

Thus, by using the installation 30 shown in FIG. 6, the same welding operations can be carried out as in the use of the device shown in FIGS. 1 and 2. The welding device 37 may also be used for electron beam butt welding the shells 28 and 29.

The fluidtight enclosure 38 permits defining a chamber 44 around the outer casing of the steam generator or outside this casing, the chamber 44 being put under a low pressure for the electron beam welding.

In order to butt weld the shells 27, 29 along the connection region 43, there are in addition placed inside the casing in the region of the connection region fluidtight walls defining an internal chamber 45 in facing relation to the connection region 43.

Likewise, for carrying out electron beam welding operations in the vicinity of the tube plate 34 of the steam generator, walls defining a sealed chamber 45' are placed inside the casing 31 of the steam generator. Lastly, for welding the sleeves for welding the shells 29 and 28, for welding the shells 29 and 28, walls defining a chamber 45" are placed inside the casing 31. Pump circuits (not shown) permit creating low pressures in the chamber 44 and the chambers 45, 45' and 45".

Figure 7:
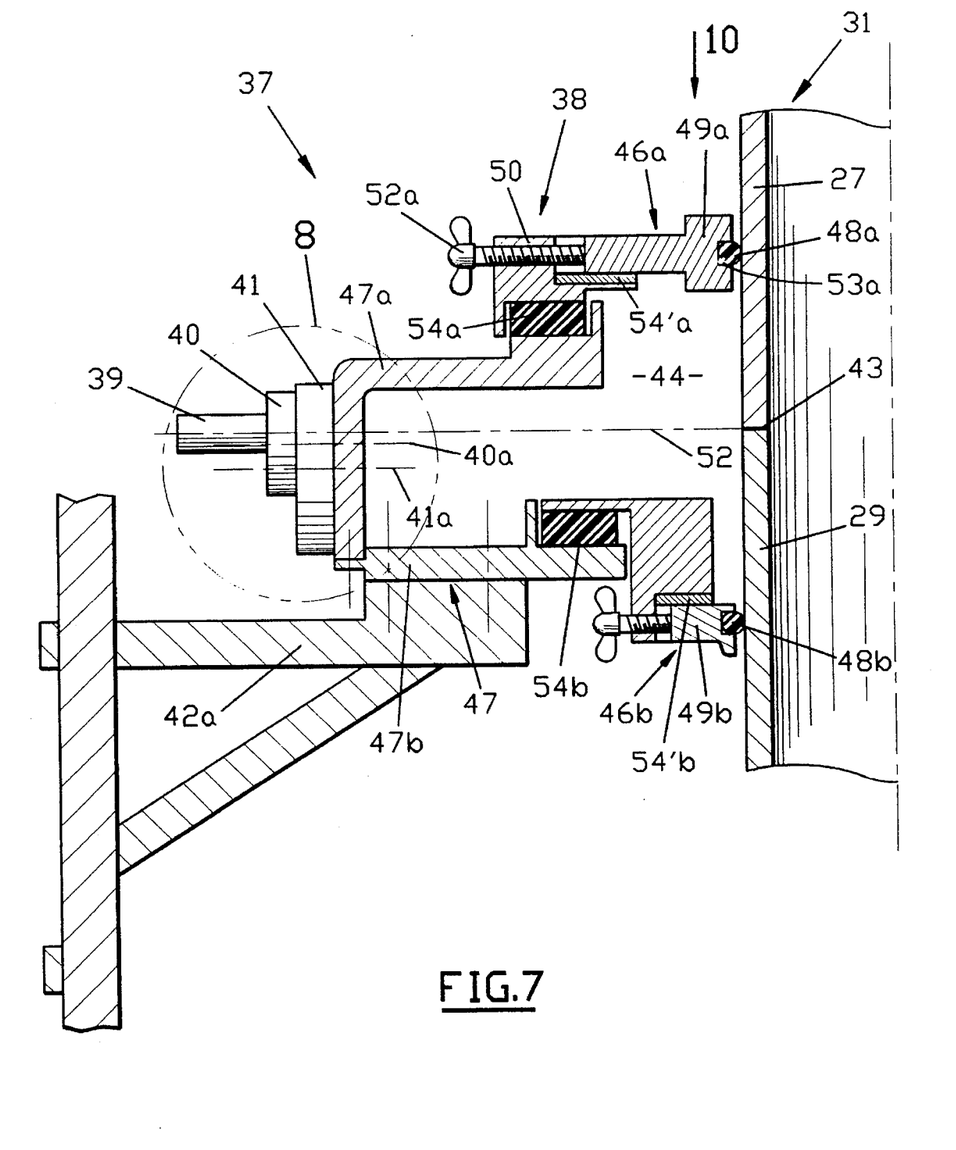
FIG. 7 is a sectional view on a larger scale of a part of FIG. 6.

FIG. 7 shows a part of the welding device 37 in a position for effecting the electron beam butt welding of the shells 27 and 29 in the joint region 43.

The sealed enclosure 38 of the welding device 37 comprises two walls 46a and 46b fixed on the casing of the steam generator constituted by the shells 27 and 29 throughout the periphery of the outer surface of the casing 31, on each side of the joint region 43.

The sealed enclosure 38 further comprises a complementary part 47 fixed to the supports such as 42a.

The walls 46a and 46b connected to the casing 31 are made in a plurality of parts permitting the mounting of the enclosure 38 around the casing 31 of the steam generator and the positioning of sealing elements 48a and 48b in contact with the outer surface of the casing 31.

Figure 10:
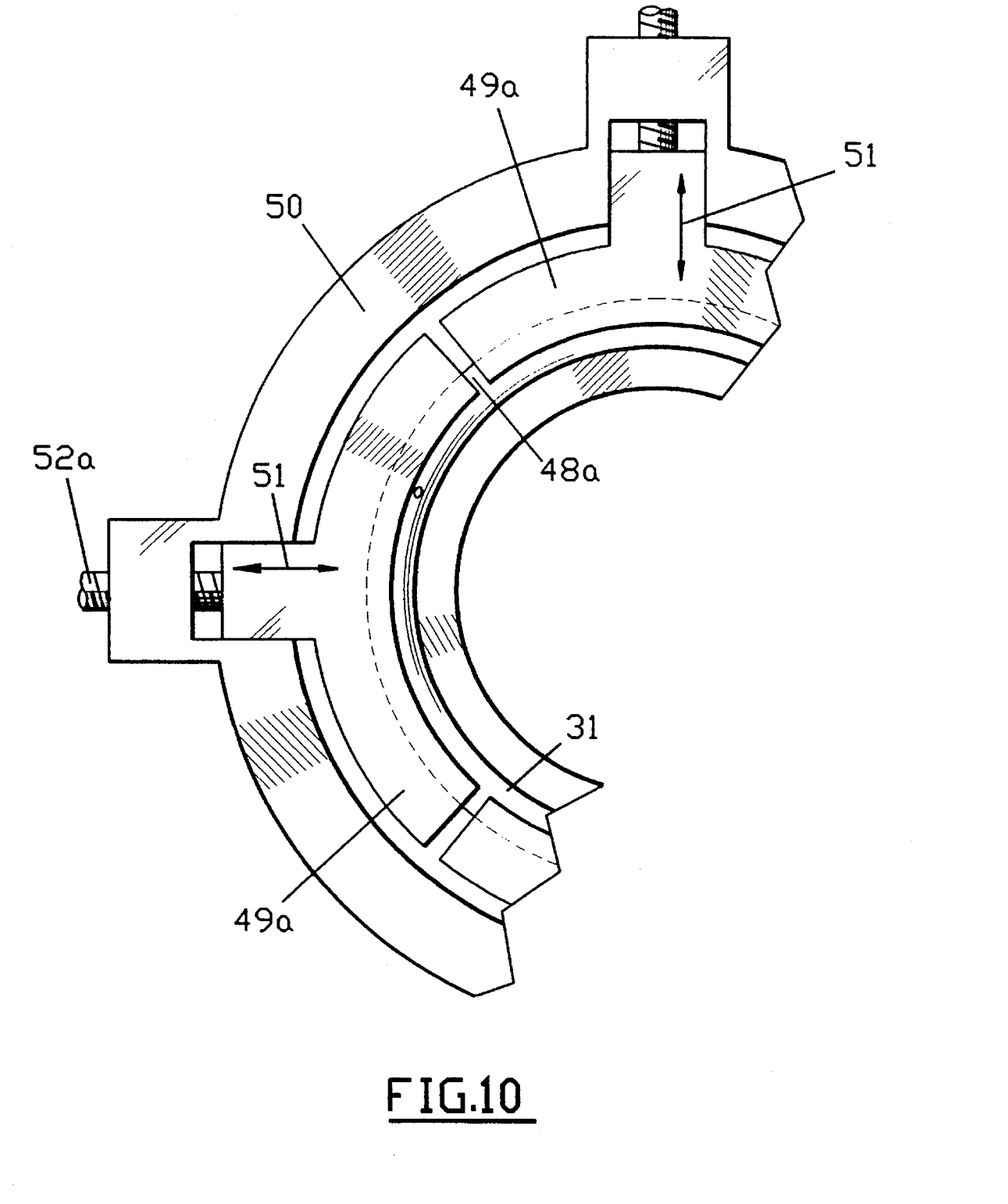
FIG. 10 is a partial top plan view in the direction of arrow 10 of FIG. 7 of a part of the welding device.

As can be seen in FIGS. 7 and 10, the wall 46a has an inner part in the form of a succession of circular sectors 49a and an outer part 50 of annular shape including radially extending recesses for guiding outwardly extending projecting portions of the sectors 49a for their radial travel in one direction or the other, as shown by the arrows 51.

Adjusting screws such as 52a rotatively mounted in the radially projecting portion of the annular sector 49a and prevented from axial translation, are engaged in a tapped hole in the outer portion 50 of the wall 46a. The adjusting screws such as 52a permit shifting the annular sectors, such as 49a, radially in one direction or the other, as shown by the arrow 51 (FIG. 10). The annular sectors 49a include an inner groove 53a in which the inflatable sealing element 48a is engaged.

The wall 46a bears, through the medium of its outer peripheral portion 50 and a sliding sealing element 54a, against the complementary wall 47 which is held fast on the fixed supports, such as 42a.

The wall 46b constituted by the annular sectors 49b has a general structure similar to the structure of the wall 46a and bears, through the medium of a sliding sealing element 54b, against the complementary wall 47. Flat sealing elements 54'a and 54'b are interposed between the sectors 49a and 49b, respectively and the corresponding outer parts.

The sliding sealing elements 54'a and 54'b are disposed on the entire periphery of the complementary wall 47 of annular shape and seal the chamber 44 throughout the joint region between the walls 46a and 46b, on one hand, and the complementary wall 47 on the other hand.

The complementary wall 47 is made in two parts 47a and 47b which are interconnected by screws with interposition of sealing elements so as to close the chamber 44 in a completely sealed manner.

Figure 8:
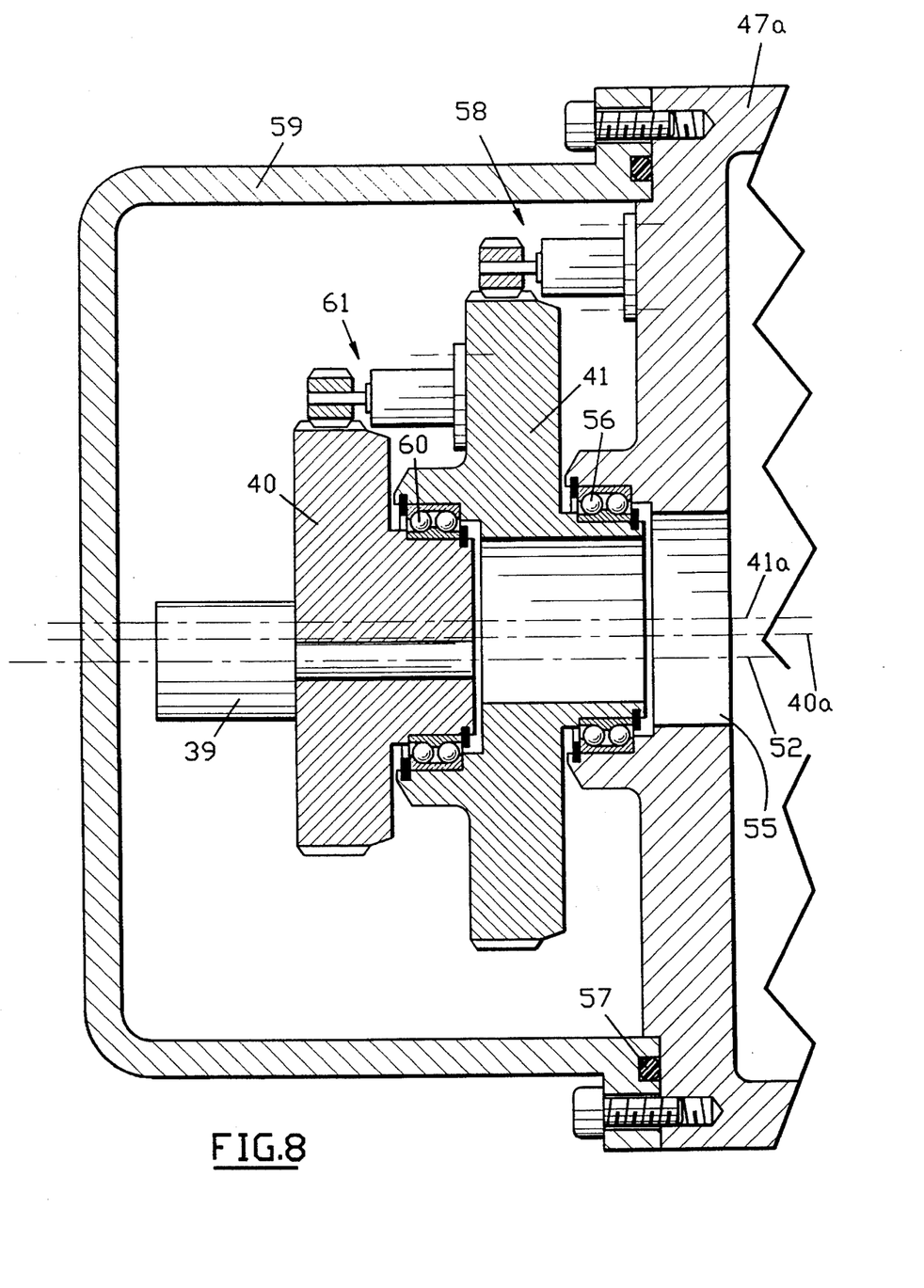
FIG. 8 is a sectional view of the detail 8 of FIG. 7.

As can be seen in FIG. 8, the part 47a of the complementary wall 47 is provided with an opening 55 permitting the passage of the electron beam 52 coming from the electron gun 39 in the chamber 44.

The assembly constituted by the rotatable plates 40 and 41 and the electron gun 39 is disposed inside a housing 59 fixed in a sealed manner on the part 47a by means of a sealing element 57.

The plate 41 is rotatively mounted on the wall 47 by means of a rolling bearing 56 whose axis coincides with the axis 41a of the plate.

The plate 41 may be driven in rotation about its axis 41a by a motor unit 58 fixed on the part 47a of the wall 47 and comprising an output shaft fixed to a driving gear pinion engaged with teeth machined on the outer edge of the plate 41 in the manner of a gear wheel.

The plate 40 is mounted on the plate 41 to rotate about its axis 40a by means of a rolling bearing 60.

The plate 40 may be driven in rotation about its axis 40a by a motor unit 61 fixed to the plate 41 and comprising an output shaft fixed to a driving gear meshed with teeth machined on the outer edge of the plate 40 in the manner of a gear wheel.

The plates 40 and 41 define openings in the extension of the opening 55 to allow the passage of the electron beam 52.

Figure 9:
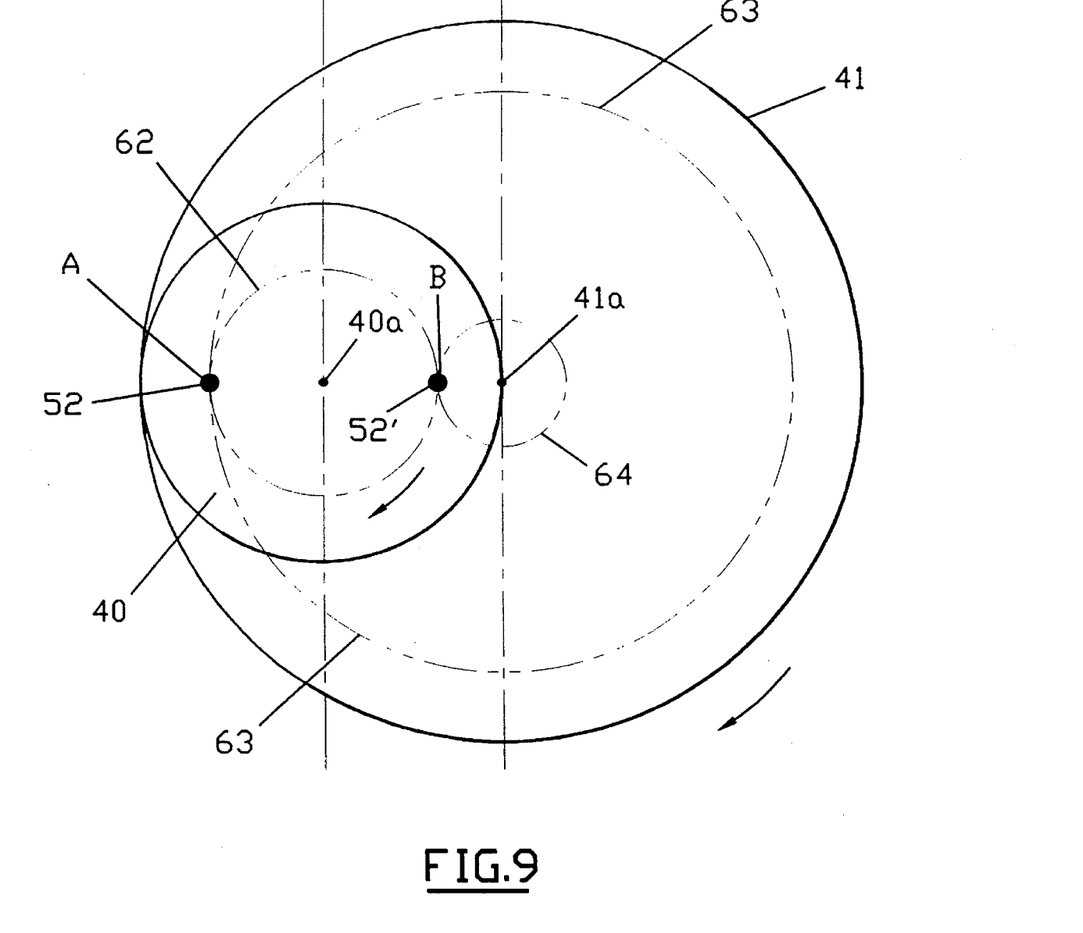
FIG. 9 is a schematic view of the kinematics of the displacement of the electron gun of the device shown in FIGS. 6 and 7.

As can be seen in FIG. 9, the plates 40 and 41 allow the electron beam 52 produced by the electron gun carried by the plate 40 to scan in a circular path, whose radius may be adjusted.

If the plate 41 remains fixed and the plate 40 carrying the electron gun 39 is rotated, the electron beam 52 scans a circular region 62 whose radius is equal to the distance between the axis 40a of the plate 40 and the firing direction 52 of the electron gun 39.

If the plate 41 is rotated, the plate 40 remaining fixed on the plate 41, the beam 52 scans a circular region having an axis 41a which may have a radius adjustable to any value between the length of the radius of the circular region 63 corresponding to the position 52 of the electron beam and the length of the radius of the circular region 64 corresponding to the position 52' of the electron beam.

In order to adjust the scanning radius of the electron beam 52, the plate 40 is rotated about its axis 40a until the axis of the electron gun corresponding to the firing direction 52 of the electron beam reaches the desired position. The position of the plate 40 is then fixed on the plate 41 by stopping the operation of the motor unit 61. The scanning for effecting the electron beam welding is produced by rotating the plate 41 about its axis 41a.

For the purpose of placing in position the sealed enclosure 38 of the welding device 37 around the casing 31 of the steam generator in which it is desired to produce one or more electron beam welds, the supports such as 42a and 42b of the complementary wall 47 are shifted to the desired position in the direction of the vertical axis 32 of the case 31 of the steam generator, the part 47b of the complementary wall 47 is fixed on the supports, such as 42a and 42b, and then the wall 46b is engaged from above around the casing 31 of the steam generator and comes to rest on the part 47b of the complementary wall with interposition of a sliding sealing element 54b.

It will be understood that, in order to engage the wall 46b around the case 31 of the steam generator, the sectors 49b of this wall, similar to the sectors 49a of the wall 46a, are placed in an unscrewed position by means of screws similar to the screws 52a. In this position, the sectors 49b are shifted outwardly in the recesses in the part similar to the outer part 50 of the wall 46b.

The sealing element 48b, which is not subjected to an inflating fluid pressure, may be easily engaged on and slid along the outer surface of the casing 31.

The part 47a of the complementary wall 47 is then fixed on the part 47b, the part 47a being engaged by the end of the steam generator.

Lastly, the wall 46a is engaged around the casing 31 of the steam generator and comes to bear against the part 47a of the complementary wall 47 through the sliding sealing element 54a.

By screwing the screws such as 52a, the sectors such as 49a and 49b of the walls 46a and 46b are clamped in such manner as to place the sealing elements 48a and 48b in contact with the outer surface of the casing 31.

The inflation of the sealing elements by means of a fluid under pressure completes the clamping of the walls 46a and 46b against the outer surface of the wall 31 and closes the chamber 44 in a sealed manner.

The flat sealing elements 54'a and 54'b provide the seal between the sectors 49a and 49b, on one hand, and the parts such as 50 on the other hand.

As previously described, the chamber 44 (together with an internal chamber such as 45) is put under low pressure and the electron beam welding is carried out after adjustment of the position of the gun 39 by effecting the scanning either by rotating the casing 31 about its axis (butt welding of the shells 27, 29 along the joint 43), or by rotating one of the plates 40 and 41 (welding of a pipe or a nozzle on the case 31).

If electron beam welding is to be carried out in another region along the height of the casing 31, the entire welding device 37 is shifted by means of the movable supports such as 42a and 42b, after having placed the sectors constituting the inner parts of the walls 46a and 46b in an unclamped position relative to the outer surface of the casing 31.

In any event, electron beam welding operations can be very rapidly and very easily carried out in any region of the casing of the steam generator.

The process according to the invention therefore permits considerably reduction in the time required to prepare and produce the assembly welds of a steam generator, and therefore the time required to manufacture such steam generator.

The welding device, and in particular the sealed chamber and the means for shifting the electron gun, may be constructed in a manner other than that described.

It is possible to use any means for shifting the electron gun relative to the parts to be welded for scanning a connection region of any shape.

The welding device and the sealed enclosure may be constructed in a substantially similar manner for welding a steam generator having a horizontal or vertical axis.

Lastly, the process and the device according to the invention may be used for welding component parts of a component of large size of a nuclear reactor other than a steam generator.

The process may also be used for producing components of large size of installations other than nuclear reactors in any type of industry.

What is claimed is:

1. A device for the electron beam welding of two component parts of a component of large size interconnected along a joint region which is of substantially annular shape and opens onto an outer cylindrical surface of said component, said device comprising, in combination:

(a) an enclosure having a first part including means for fixing said enclosure in a fluid-tight manner around said outer cylindrical surface of said component and a second part mounted on said first part in a fluid-tight manner and movable in rotation around an axis of rotation with respect to said first part;

(b) an electron gun mounted on said second part of said enclosure in such a manner as to direct an electron beam toward an interior side of said enclosure;

(c) means for moving said first and said second parts of said enclosure in rotation relatively to each other around said axis of rotation;

(d) wherein said first part of said enclosure comprises two units, each unit comprising a ring defining radially extending recesses, and a plurality of annular sectors having said axis of rotation as a common axis guided in radial directions in said recesses in said ring, and means for radially displacing each of said sectors selectively in a direction toward and away from said outer cylindrical surface of said component, and an inflatable annular sealing element engaged in an inner peripheral part of said annular sectors.

2. The device according to claim 1, comprising two sliding sealing elements of annular shape interposed between each of said units of said first part and said second part of said enclosure.

3. The device according to claim 1, wherein said second part of said enclosure comprises two parts interconnected in a detachable and fluid-tight manner.

4. The device according to claim 1, comprising a first rotary plate, a second rotary plate rotatively mounted on said second part of said enclosure, said first rotary plate being rotatively mounted on said second rotary plate, said electron gun being fixed on said first rotary plate, an axis of rotation of said first rotary plate and an axis of rotation of said second rotary plate being respectively parallel and spaced apart from each other, and the axis of said electron gun along which said electron beam is emitted being parallel to said axis of said first rotary plate and to said axis of said second rotary plate and spaced by a predetermined distance away from said axes.

* * * * *